United States Patent
Tsao et al.

(10) Patent No.: US 9,425,612 B2
(45) Date of Patent: Aug. 23, 2016

(54) OUTPUT POWER PROTECTION APPARATUS AND METHOD OF OPERATING THE SAME

(71) Applicant: DELTA ELECTRONICS, INC., Taoyuan County (TW)

(72) Inventors: Wen-Sheng Tsao, Taoyuan County (TW); Chin-Hou Chen, Taoyuan County (TW); Jui-Teng Chan, Taoyuan County (TW); Chen-Tung Chang, Taoyuan County (TW); Chen-Bin Huang, Taoyuan County (TW); Wei-Cheng Peng, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 245 days.

(21) Appl. No.: 14/448,136

(22) Filed: Jul. 31, 2014

(65) Prior Publication Data

US 2015/0244167 A1    Aug. 27, 2015

(30) Foreign Application Priority Data

Feb. 24, 2014  (TW) .............................. 103105996 A

(51) Int. Cl.
| | |
|---|---|
| *H02H 7/00* | (2006.01) |
| *H02H 9/02* | (2006.01) |
| *H02J 7/00* | (2006.01) |
| *B60L 3/00* | (2006.01) |
| *B60L 11/18* | (2006.01) |

(52) U.S. Cl.
CPC ............... *H02H 9/02* (2013.01); *H02J 7/0031* (2013.01); *H02J 7/0034* (2013.01); *H02J 7/0054* (2013.01); *B60L 3/0046* (2013.01); *B60L 3/0069* (2013.01); *B60L 11/1868* (2013.01); *B60L 2210/10* (2013.01); *B60L 2210/12* (2013.01); *H02J 2007/0039* (2013.01); *Y02T 10/7005* (2013.01); *Y02T 10/7066* (2013.01); *Y02T 10/7216* (2013.01)

(58) Field of Classification Search
CPC .................................. H02H 9/02; H02J 7/0031
USPC ......................................................... 361/93.1
See application file for complete search history.

(56) References Cited

U.S. PATENT DOCUMENTS

| | | | | |
|---|---|---|---|---|
| 4,949,016 | A * | 8/1990 | De Bijl | H04B 41/28 315/208 |
| 5,871,858 | A * | 2/1999 | Thomsen | B60R 25/04 327/403 |
| 6,263,192 | B1 * | 7/2001 | Alderton | H02M 3/156 455/557 |
| 7,332,876 | B2 * | 2/2008 | Ichikawa | H05B 41/2925 315/209 R |
| 8,508,190 | B2 * | 8/2013 | Tatebayashi | H01M 4/661 320/118 |
| 9,013,839 | B1 * | 4/2015 | Vander Laan | H02H 3/093 361/23 |

\* cited by examiner

*Primary Examiner* — Stephen W Jackson
(74) *Attorney, Agent, or Firm* — Hauptman Ham, LLP

(57) ABSTRACT

An output power protection apparatus includes a DC conversion unit, an output protection unit, a high-voltage battery, a low-voltage battery, and a control unit. The DC conversion unit converts an input DC power into an output DC power. The output protection unit is connected in series to the DC conversion unit, and the output protection unit has a plurality of protection circuits connected in parallel to each other. When a short-circuit condition occurs between the high-voltage battery and the low-voltage battery or the low-voltage battery is reversely connected in polarity, the control unit generates a control signal to control the protection circuits to disconnect the connection between the low-voltage battery and a low-voltage device, and the DC conversion unit.

20 Claims, 7 Drawing Sheets

OUTPUT POWER PROTECTION APPARATUS AND METHOD OF OPERATING THE SAME

BACKGROUND

1. Technical Field

The present disclosure relates generally to an output power protection apparatus and a method of operating the same, and more particularly to a DC output power protection apparatus, which is applied to an electric vehicle or a hybrid electric vehicle, and a method of operating the same.

2. Description of Related Art

Because of the environmental awareness today, the hybrid electric vehicle (HEV) with energy-saving and low-pollution advantages is increasingly popular. In addition, the HEV is a vehicle which combines advantages of large output power, good endurance, and low noise. Accordingly, the HEV is more competitive to become the mainstream vehicle in the future.

Reference is made to FIG. 1 which is a schematic block diagram of a related art in-vehicle power conversion system. The in-vehicle power conversion system includes a DC converter 20A, a high-voltage battery 40A, and a low-voltage battery 50A. The DC converter 20A receives an input DC power Vin and converts the input DC power Vin into an output DC power Vout to supply the required power to a low-voltage device 30A. In general, the DC converter 20A is a non-isolated converter with the advantages of simple circuit structure, low costs, and high efficiency. However, it does not meet the safety requirements once the existing DC converter 20A occurs a short-circuit condition between the high-voltage side and the low-voltage side because the elements of the DC converter 20A are damaged. In addition, the low-voltage battery 50 may be reversely connected in polarity to the system so that the low-voltage battery 50 is damaged. In other words, the short-circuit condition between the high-voltage and low-voltage sides and the polarity reverse of the low-voltage battery 50 would reduce the power supply reliability of the electric vehicle or the hybrid electric vehicle can be increased. Also, it is to increase the additional costs of replacing the damaged devices or elements because the low-voltage battery 50A or the low-voltage device 30A is damaged. In addition, the malfunction of the electric vehicle or the hybrid electric vehicle would cause car accidents from abnormal operations or damage of the low-voltage battery 50A or the low-voltage device 30A.

Accordingly, it is desirable to provide an output power protection apparatus and a method of operating the same to applied to the non-isolated converter and isolated converter, increase the power supply reliability, save unnecessary costs of replacing the damaged devices or elements, and avoid the car accidents from abnormal operations.

SUMMARY

An object of the present disclosure is to provide an output power protection apparatus to solve the above-mentioned problems. Accordingly, the output power protection apparatus includes a DC conversion unit, an output protection unit, a high-voltage battery, a low-voltage battery, and a control unit. The DC conversion unit is configured to convert an input DC power into an output DC power. The output protection unit is connected in series to the DC conversion unit, and has a plurality of protection circuits connected in parallel to each other. The high-voltage battery is charged by the input DC power. The low-voltage battery is connected between the DC conversion unit, the output protection unit, and a low-voltage device, and is charged by the output DC power. The control unit generates a control signal to control the protection circuits to disconnect the connection between the low-voltage battery and the low-voltage device, and the DC conversion unit when a short-circuit condition occurs between the high-voltage battery and the low-voltage battery or the low-voltage battery is reversely connected in polarity.

Another object of the present disclosure is to provide a method of operating an output power protection apparatus to solve the above-mentioned problems. Accordingly, the method includes following steps: (a) a DC conversion unit is provided, the DC conversion unit is configured to convert an input DC power into an output DC power; (b) an output protection unit is provided, the output protection unit is connected in series to the DC conversion unit, and has a plurality of protection circuits connected in parallel to each other; (c) a high-voltage battery and a low-voltage battery are provided, the high-voltage battery is charged by the input DC power, and the low-voltage battery is connected between the DC conversion unit, the output protection unit, and a low-voltage device, and is charged by the output DC power; (d) a control unit is provided; and (e) a control signal is generated by the control unit to control the protection circuits to disconnect the connection between the low-voltage battery and the low-voltage device, and the DC conversion unit when a short-circuit condition occurs between the high-voltage battery and the low-voltage battery or the low-voltage battery is reversely connected in polarity.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
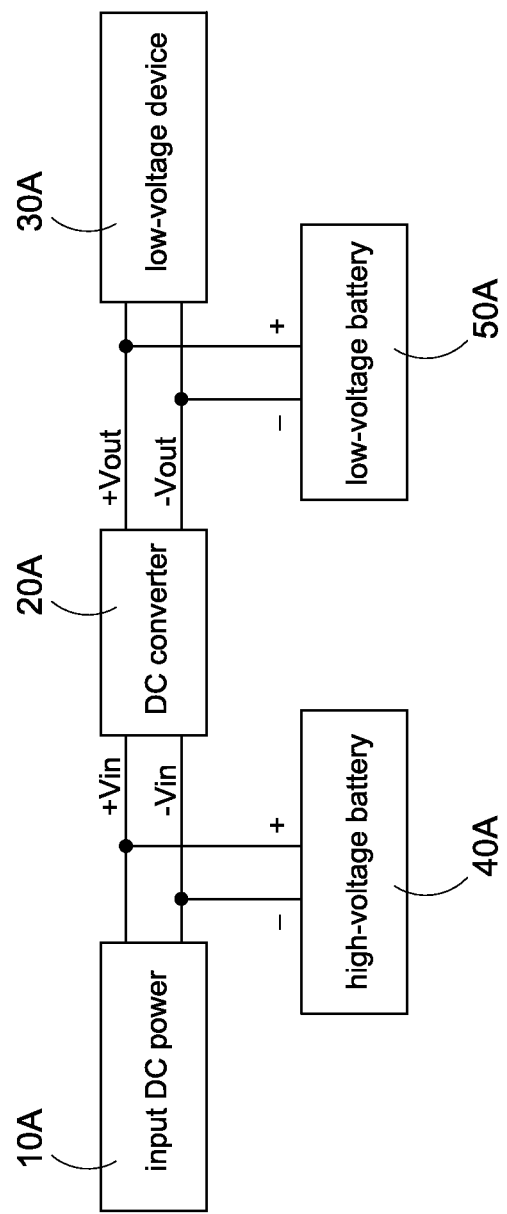
FIG. 1 is a schematic block diagram of a related art in-vehicle power conversion system.

Reference will now be made to the drawing figures to describe the present invention in detail.

Figure 2:
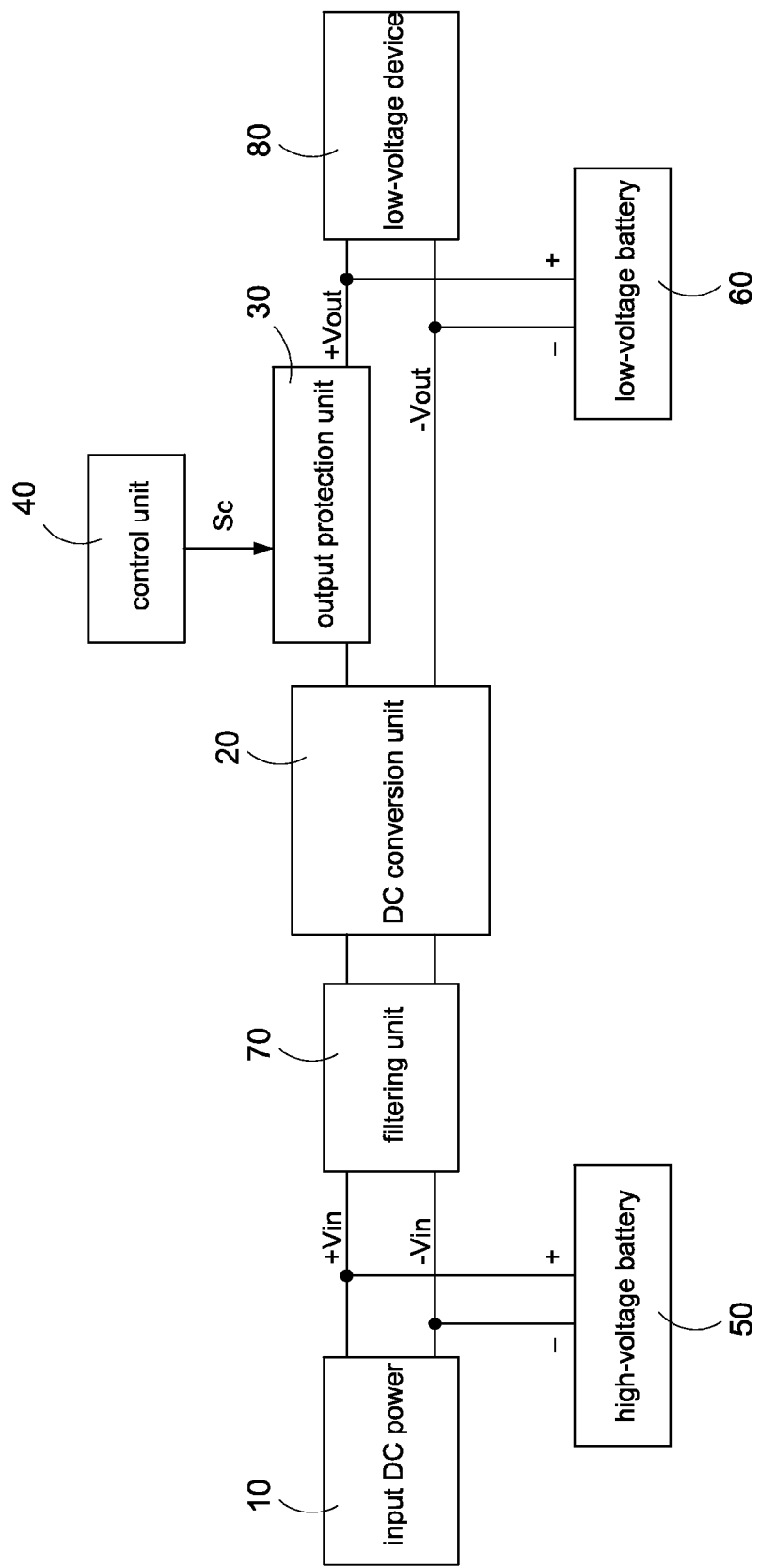
FIG. 2 is a schematic circuit block diagram of an output power protection apparatus according to the present disclosure.

Reference is made to FIG. 2 which is a schematic circuit block diagram of an output power protection apparatus according to the present disclosure. The output power protection apparatus can be applied to an electric vehicle or a hybrid electric vehicle. More specifically, the output power protection apparatus is installed in the electric vehicle or the hybrid electric vehicle to provide protections for inner low-voltage devices inside the electric vehicle or the hybrid electric vehicle.

The output power protection apparatus includes a DC conversion unit 20, an output protection unit 30, a high-voltage battery 50, a low-voltage battery 60, and a control unit 40. The DC conversion unit 20 receives an input DC power Vin and converts the input DC power Vin into an output DC power Vout. In particular, the input DC power Vin is generated from a rechargeable battery 10 or a generator 10. However, the embodiments are only exemplified but are not intended to limit the scope of the disclosure. In addition, the DC conversion unit 20 can be a non-isolated DC-to-DC converter or an isolated DC-to-DC converter. For example, the DC conversion unit 20 is used to convert a 48-volt DC voltage into a 12-volt DC voltage. However, the embodiment is only exemplified but is not intended to limit the scope of the disclosure. The output protection unit 30 is connected in series to the DC conversion unit 20, and the output protection unit 30 has a plurality of protection circuits 301 connected in parallel to each other. The high-voltage battery 50 receives the input DC power Vin and charged by the input DC power Vin. The low-voltage battery 60 is connected between the DC conversion unit 20, the output protection unit 30, and a low-voltage device 80 and charged by the output DC power Vout.

In addition, the output power protection apparatus further a filtering unit 70. The filtering unit 70 is connected to the DC conversion unit 20, and receives the input DC power Vin and filters the input DC power Vin. When a short-circuit condition occurs between the high-voltage battery 50 and the low-voltage battery 60 or the low-voltage battery 60 is reversely connected in polarity, the control unit 40 produces a control signal Sc to control the protection circuits 301 to disconnect the connection between the low-voltage battery 60 and the low-voltage device 80, and the DC conversion unit 20, thus protecting the low-voltage battery 60 and the low-voltage device 80. The detailed operation of the output power protection apparatus will be described hereinafter as follows.

Figure 3:
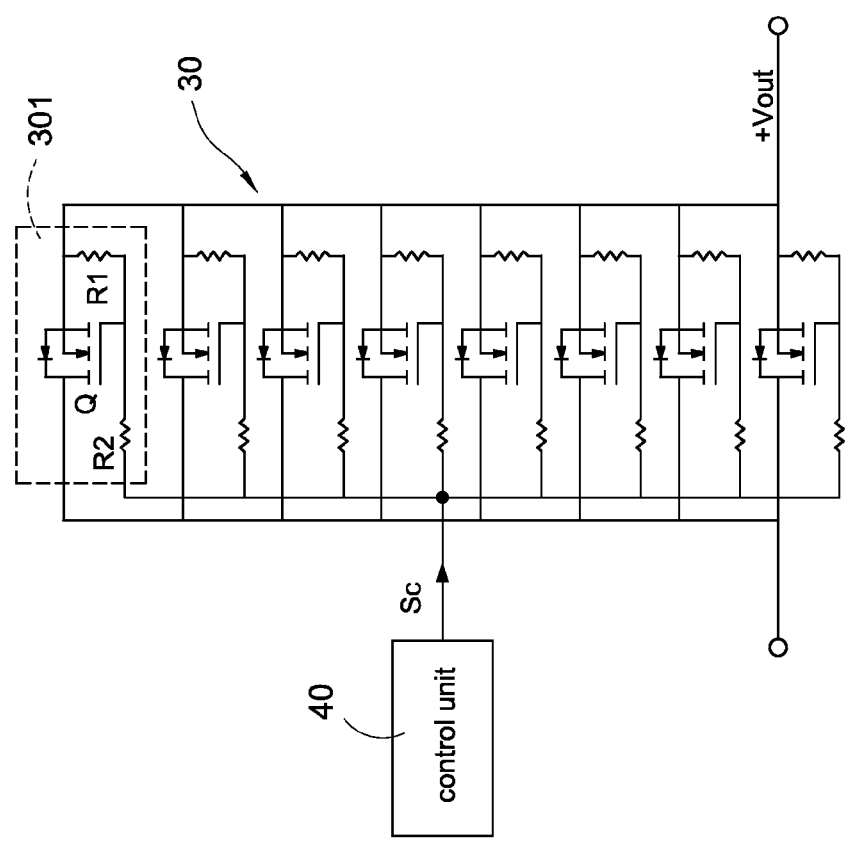
FIG. 3 is a circuit diagram of an output protection unit according to a first embodiment of the present disclosure.
Figure 4:
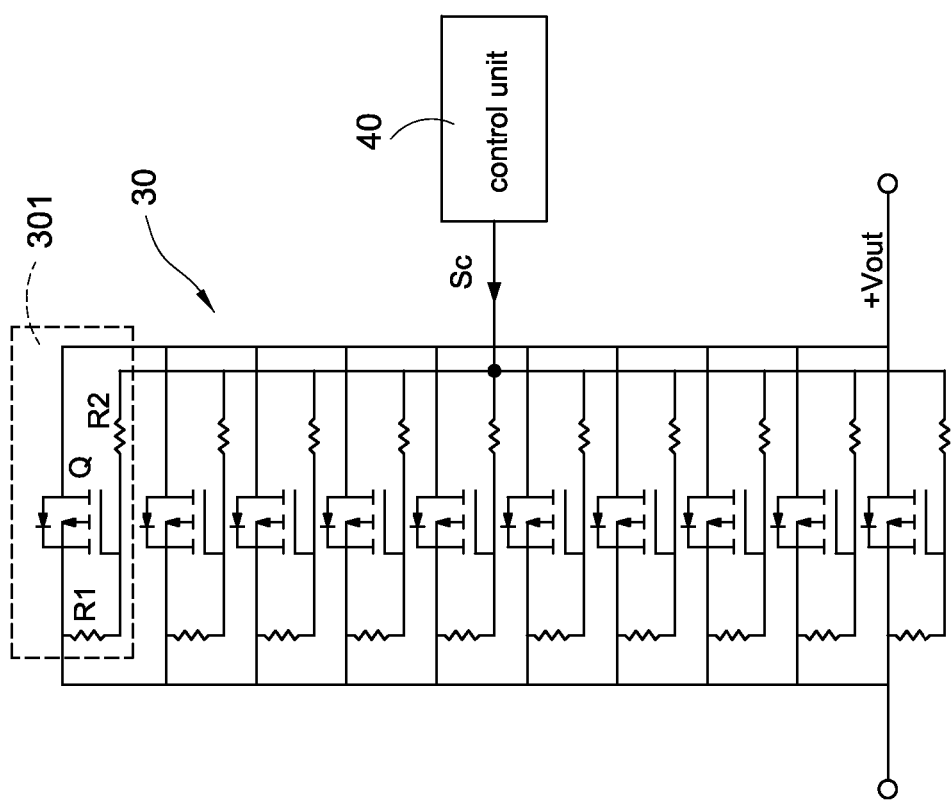
FIG. 4 is a circuit diagram of the output protection unit according to a second embodiment of the present disclosure.

Reference is made to FIG. 3 and FIG. 4 which are circuit diagrams of the output protection unit according to a first embodiment and a second embodiment of the present disclosure, respectively. Each protection circuit 301 has a transistor Q, a first resistor R1, and a second resistor R2. More specifically, the transistors of the first embodiment shown in FIG. 3 are n-type MOSFETs, and each of the n-type MOSFETs has a gate, a source, and a drain. The drain is connected to the DC conversion unit 20. The source is connected to a first terminal of the first resistor R1 and the low-voltage device 80. The gate is connected to a second terminal of the first resistor R1 and a first terminal of the second resistor R2. A second terminal of the second resistor R2 is connected to the control unit 40 to receive the control signal Sc generated from the control unit 40. In addition, the major difference between the second embodiment and the first embodiment is that the transistors of the second embodiment shown in FIG. 4 are p-type MOSFETs. Also, each of the p-type MOSFETs has a gate, a source, and a drain. The drain is connected to the low-voltage device 80. The source is connected to a first terminal of the first resistor R1 and the DC conversion unit 20. The gate is connected to a second terminal of the first resistor R1 and a first terminal of the second resistor R2. A second terminal of the second resistor R2 is connected to the control unit 40 to receive the control signal Sc generated from the control unit 40.

Figure 5:
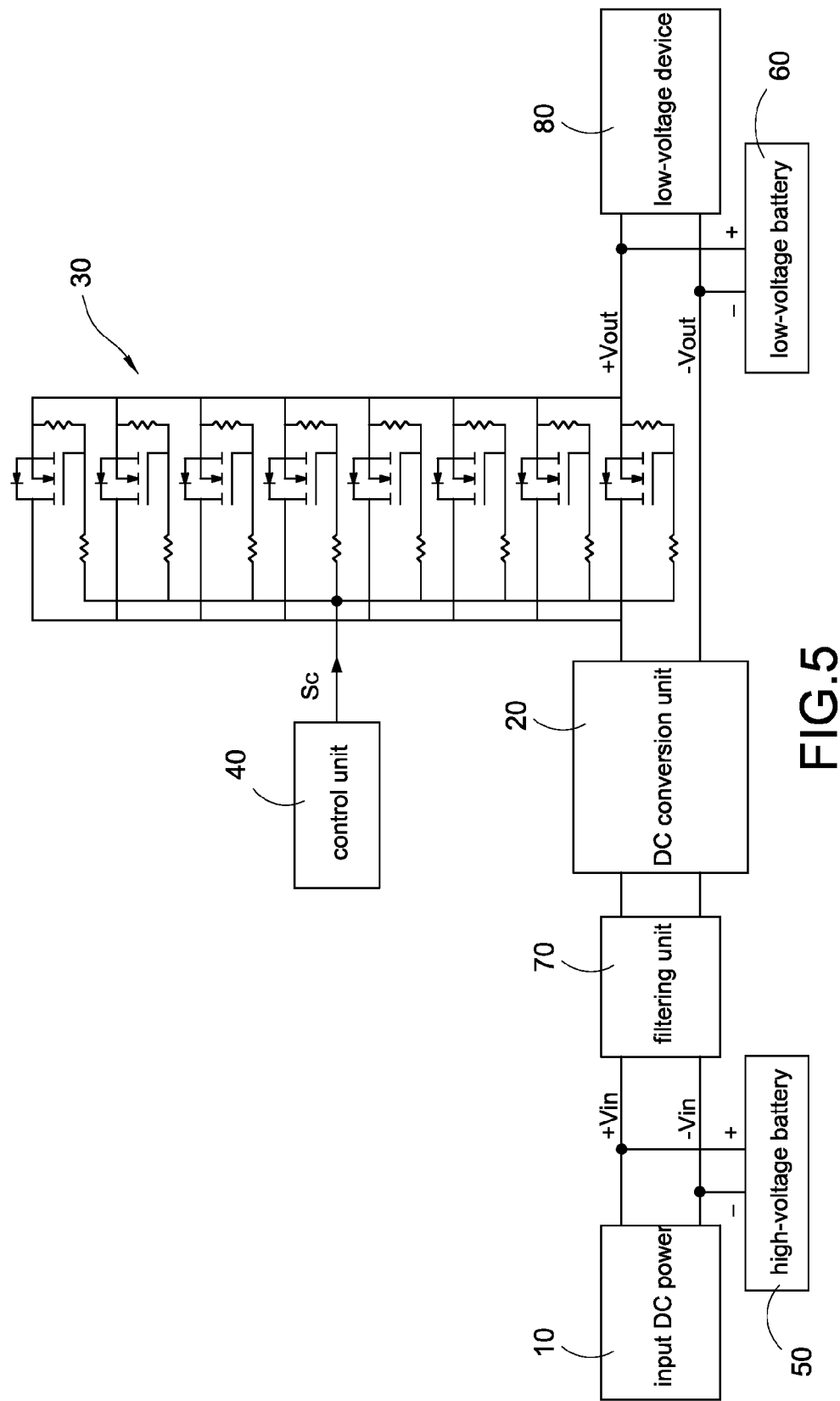
FIG. 5 is a schematic circuit diagram of the output power protection apparatus according to a first embodiment of the present disclosure.
Figure 6:
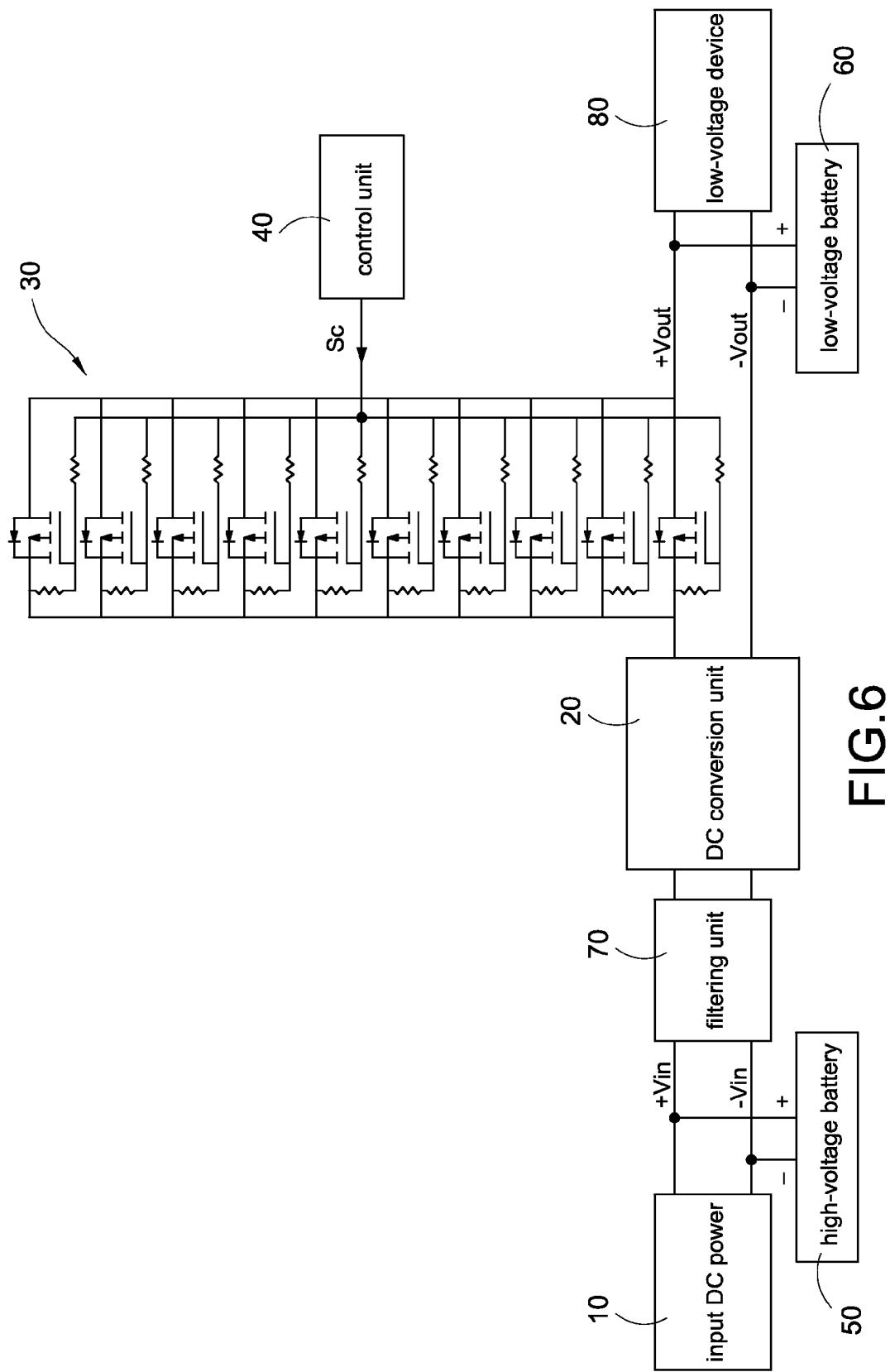
FIG. 6 is a schematic circuit diagram of the output power protection apparatus according to a second embodiment of the present disclosure.

Reference is made to FIG. 5 and FIG. 6 which are schematic circuit diagrams of the output power protection apparatus according to a first embodiment and a second embodiment of the present disclosure, respectively. For convenience, a non-isolated DC-to-DC converter is exemplified as the DC conversion unit 20 to further demonstrate the present disclosure. When the DC conversion unit 20 is normally operated, that is, a detection unit (not shown) detects that the output DC power Vout provides a normal operation voltage, the detection unit transmits a signal to notify the control unit 40 that the DC conversion unit 20 is in a normal operation condition. Accordingly, the control unit 40 generates the high-level control signal Sc to turn on the transistor switches of the protection circuits 301. Accordingly, the input DC power Vin is filtered by the filtering unit 70, and then the filtered voltage is converted from the high-voltage voltage into the low-voltage voltage by the DC conversion unit 20 to supply power to the low-voltage device 80 or charge the low-voltage battery 60.

If the DC conversion unit 20 is damaged to cause a short circuit between the high-voltage battery 50 installed in the high-voltage side and the low-voltage battery 60 installed in the low-voltage side, the detection unit detects that the output DC power Vout is an abnormal overvoltage, or detects that a current flows through the low-voltage battery 60 is an abnormal short-circuit current. Accordingly, the control unit 40 generates the low-level control signal Sc to turn off the transistor switches of the protection circuit 301 to disconnect the connection between the DC conversion unit 20 and the low-voltage battery 60 and the low-voltage device 80, thus protecting the low-voltage battery 60 and the low-voltage device 80.

Further, if the low-voltage battery 60 is reversely connected in polarity to the output DC power Vout, the detection unit detects that the output DC power Vout is a zero-volt voltage, or detects that a current flows through the low-voltage battery 60 is an abnormal short-circuit current. Accordingly, the control unit 40 generates the low-level control signal Sc to turn off the transistor switches of the protection circuit 301 to disconnect the connection between the DC conversion unit 20 and the low-voltage battery 60 and the low-voltage device 80, thus protecting the low-voltage battery 60 and the low-voltage device 80.

In brief, when the DC conversion unit 20 is the non-isolated DC-to-DC converter, the output power protection apparatus can provide a short circuit protection between the high-voltage battery 50 and the low-voltage battery 60, and further provide a polarity reverse protection of the low-voltage battery 60. In addition, when the DC conversion unit 20 is the isolated DC-to-DC converter, the output power protection apparatus can provide a polarity reverse protection of the low-voltage battery 60. In other words, the output power protection apparatus only provides the polarity reverse protection of the low-voltage battery 60 because the short circuit between the high-voltage side and the low-voltage side does not occur if the DC conversion unit 20 is the isolated DC-to-DC converter.

Especially, the number of the transistor is determined according to the output power of the DC conversion unit 20 and consumed heat of the transistors. In addition, the required number of the n-type MOSFET and the p-type MOSFET is different for the same DC conversion unit 20 because the different inherent features between the n-type MOSFET and the p-type MOSFET. Take the 2,500-watt DC conversion unit 20 for example, the required number of the n-type MOSFET is eight (as shown in FIG. 5), but the required number of the p-type MOSFET is ten (as shown in FIG. 6). Accordingly, the correct number of the transistor is used to implement the optimal protection effect for the output power protection apparatus.

Figure 7:
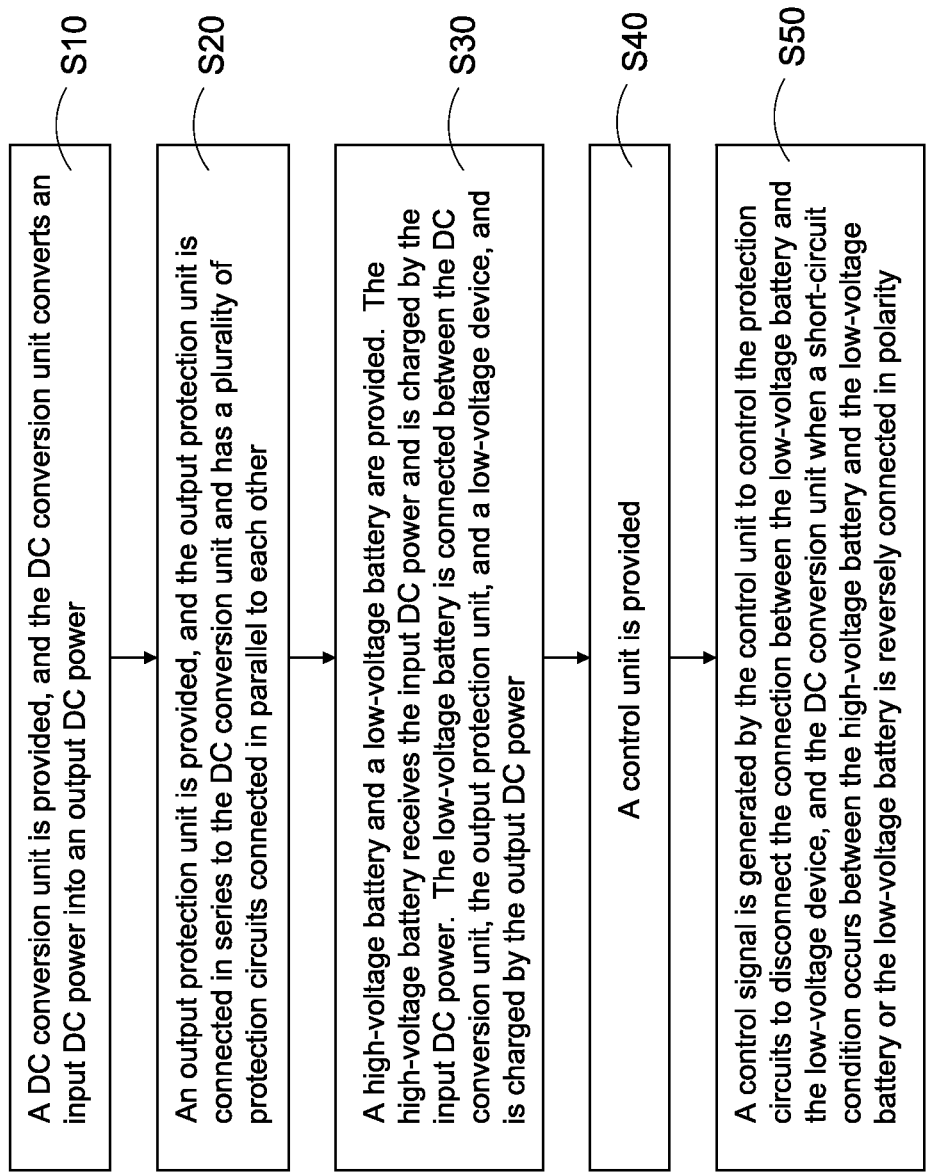
FIG. 7 is a flowchart of operating the output power protection apparatus according to the present disclosure.

Reference is made to FIG. 7 which is a flowchart of operating the output power protection apparatus according to the present disclosure. The output power protection apparatus is applied to an electric vehicle or a hybrid electric vehicle. More specifically, the output power protection apparatus is installed in the electric vehicle or the hybrid electric vehicle to provide protections for inner low-voltage devices inside the electric vehicle or the hybrid electric vehicle. The method of operating the output power protection apparatus includes following steps. First, a DC conversion unit is provided, and the DC conversion unit converts an input DC power into an output DC power (S10). In particular, the input DC power is generated from a rechargeable battery or a generator, but not limited. In addition, the DC conversion unit is a non-isolated DC-to-DC converter or an isolated DC-to-DC converter, and is used to convert a 48-volt DC voltage into 12-volt DC voltage. However, the embodiments are only exemplified but are not intended to limit the scope of the disclosure. Afterward, an output protection unit is provided, and the output protection unit is connected in series to the DC conversion unit and has a plurality of protection circuits connected in parallel to each other (S20). In particular, each protection circuit has a transistor, a first resistor, and a second resistor. Afterward, a high-voltage battery and a low-voltage battery are provided. The high-voltage battery receives the input DC power and is charged by the input DC power. The low-voltage battery is connected between the DC conversion unit, the output protection unit, and a low-voltage device, and is charged by the output DC power (S30). In addition, the method further provides a filtering unit. The filtering unit is connected to the DC conversion unit to receive the input DC power and filter the input DC power. Afterward, a control unit is provided (S40). Finally, a control signal is generated by the control unit to control the protection circuits to disconnect the connection between the low-voltage battery and the low-voltage device, and the DC conversion unit when a short-circuit condition occurs between the high-voltage battery and the low-voltage battery or the low-voltage battery is reversely connected in polarity (S50).

More specifically, when the DC conversion unit is normally operated, that is, a detection unit (not shown) detects that the output DC power provides a normal operation voltage, the detection unit transmits a signal to notify the control unit that the DC conversion unit is in a normal operation condition. Accordingly, the control unit generates the high-level control signal to turn on the transistor switches of the protection circuits. Accordingly, the input DC power is filtered by the filtering unit, and then the filtered voltage is converted from the high-voltage voltage into the low-voltage voltage by the DC conversion unit to supply power to the low-voltage device or charge the low-voltage battery.

If the DC conversion unit is damaged to cause a short circuit between the high-voltage battery installed in the high-voltage side and the low-voltage battery installed in the low-voltage side, the detection unit detects that the output DC power is an abnormal overvoltage, or detects that a current flows through the low-voltage battery is an abnormal short-circuit current. Accordingly, the control unit generates the low-level control signal to turn off the transistor switches of the protection circuit to disconnect the connection between the DC conversion unit and the low-voltage battery and the low-voltage device, thus protecting the low-voltage battery and the low-voltage device.

Further, if the low-voltage battery is reversely connected in polarity to the output DC power, the detection unit detects that the output DC power is a zero-volt voltage, or detects that a current flows through the low-voltage battery is an abnormal short-circuit current. Accordingly, the control unit generates the low-level control signal to turn off the transistor switches of the protection circuit to disconnect the connection between the DC conversion unit and the low-voltage battery and the low-voltage device, thus protecting the low-voltage battery and the low-voltage device.

In brief, when the DC conversion unit is the non-isolated DC-to-DC converter, the output power protection apparatus can provide a short circuit protection between the high-voltage battery and the low-voltage battery, and further provide a polarity reverse protection of the low-voltage battery. In addition, when the DC conversion unit is the isolated DC-to-DC converter, the output power protection apparatus can provide a polarity reverse protection of the low-voltage battery. In other words, the output power protection apparatus only provides the polarity reverse protection of the low-voltage battery because the short circuit between the high-voltage side and the low-voltage side does not occur if the DC conversion unit is the isolated DC-to-DC converter.

Especially, the number of the transistor is determined according to the output power of the DC conversion unit and consumed heat of the transistors. In addition, the required number of the n-type MOSFET and the p-type MOSFET is different for the same DC conversion unit because the different inherent features between the n-type MOSFET and the p-type MOSFET. Take the 2,500-watt DC conversion unit for example, the required number of the n-type MOSFET is eight (as shown in FIG. 5), but the required number of the p-type MOSFET is ten (as shown in FIG. 6). Accordingly, the correct number of the transistor is used to implement the optimal protection effect for the output power protection apparatus.

In conclusion, the present disclosure has following advantages:

1. The output power protection apparatus can be applied to the non-isolated DC-to-DC converter and the isolated DC-to-DC converter. When the DC conversion unit 20 is the non-isolated DC-to-DC converter, the output power protection apparatus can provide both a short-circuit protection between the high-voltage battery 50 and the low-voltage battery 60 and a polarity reverse protection of the low-voltage battery 60. When the DC conversion unit 20 is the isolated DC-to-DC converter, the output power protection apparatus can provide a polarity reverse protection of the low-voltage battery 60;

2. The detection unit detects the output DC power Vout or the current flowing through the low-voltage battery 60 to judge whether the DC conversion unit 20 is damaged or the low-voltage battery 60 is reversely connected in polarity. In addition, the DC conversion unit 20 is immediately turned off or disabled by the output protection unit 30 once any abnormal operation is detected. Accordingly, the power supply reliability of the electric vehicle or the hybrid electric vehicle can be increased. Also, it is to reduce the additional costs of replacing the damaged devices or elements because the low-voltage battery 60 or the low-voltage device 80 is damaged. In addition, it is to avoid malfunction of the electric vehicle or the hybrid electric vehicle to cause car accidents from abnormal operations or damage of the low-voltage battery 60 or the low-voltage device 80; and 3. The required optimal number of the n-type MOSFET or the p-type MOSFET can be calculated or simulated by a computer according to the output power of the DC conversion unit and consumed heat of the transistors to implement the optimal protection effect for the output power protection apparatus.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An output power protection apparatus comprising:
   a DC conversion unit configured to convert an input DC power into an output DC power;
   an output protection unit connected in series to the DC conversion unit, and having a plurality of protection circuits connected in parallel to each other;
   a high-voltage battery being charged by the input DC power;
   a low-voltage battery connected between the DC conversion unit, the output protection unit, and a low-voltage device, and being charged by the output DC power; and
   a control unit;
   wherein the control unit is configured to generate a control signal to control the protection circuits to disconnect the connection between the low-voltage battery and the low-voltage device, and the DC conversion unit when a short-circuit condition occurs between the high-voltage battery and the low-voltage battery or the low-voltage battery is reversely connected in polarity.

2. The output power protection apparatus in claim 1, wherein each protection circuit comprises a transistor, a first resistor, and a second resistor; the transistor has a gate, a source, and a drain; the first resistor is connected between the source and the gate; the second resistor is connected between the source and the control unit.

3. The output power protection apparatus in claim 2, wherein the transistors are n-type MOSFETs; each n-type MOSFET has a gate, a source, and a drain; the drain is connected to the DC conversion unit; the source is connected to a first terminal of the first resistor and the low-voltage device; the gate is connected to a second terminal of the first resistor and a first terminal of the second resistor; a second terminal of the second resistor is connected to the control unit.

4. The output power protection apparatus in claim 2, wherein the transistors are p-type MOSFETs; each p-type MOSFET has a gate, a source, and a drain; the drain is connected to the low-voltage device; the source is connected to a first terminal of the first resistor and the DC conversion unit; the gate is connected to a second terminal of the first resistor and a first terminal of the second resistor; a second terminal of the second resistor is connected to the control unit.

5. The output power protection apparatus in claim 2, wherein the number of the transistor is determined according to the output power of the DC conversion unit and consumed heat of the transistors.

6. The output power protection apparatus in claim 1, further comprising:
   a filtering unit connected to the DC conversion unit, and configured to receive the input DC power and filter the input DC power.

7. The output power protection apparatus in claim 1, wherein the DC conversion unit is a non-isolated DC-to-DC converter or an isolated DC-to-DC converter.

8. The output power protection apparatus in claim 7, wherein the output protection apparatus is configured to provide a short-circuit protection between the high-voltage battery and the low-voltage battery and a polarity reverse protection of the low-voltage battery when the DC conversion unit is the non-isolated DC-to-DC converter.

9. The output power protection apparatus in claim 7, wherein the output protection apparatus is configured to provide a polarity reverse protection of the low-voltage battery when the DC conversion unit is the isolated DC-to-DC converter.

10. The output power protection apparatus in claim 1, wherein the input DC power is generated from a rechargeable battery or a generator.

11. A method of operating an output power protection apparatus comprising following steps:
    (a) providing a DC conversion unit, the DC conversion unit configured to convert an input DC power into an output DC power;
    (b) providing an output protection unit, the output protection unit connected in series to the DC conversion unit, and having a plurality of protection circuits connected in parallel to each other;
    (c) providing a high-voltage battery and a low-voltage battery, the high-voltage battery being charged by the input DC power, and the low-voltage battery connected between the DC conversion unit, the output protection unit, and a low-voltage device, and being charged by the output DC power;
    (d) providing a control unit; and
    (e) generating a control signal by the control unit to control the protection circuits to disconnect the connection between the low-voltage battery and the low-voltage device, and the DC conversion unit when a short-circuit condition occurs between the high-voltage battery and the low-voltage battery or the low-voltage battery is reversely connected in polarity.

12. The method of operating the output power protection apparatus in claim 11, wherein each protection circuit comprises a transistor, a first resistor, and a second resistor; the transistor has a gate, a source, and a drain; the first resistor is connected between the source and the gate; the second resistor is connected between the source and the control unit.

13. The method of operating the output power protection apparatus in claim 12, wherein the transistors are n-type MOSFETs; each n-type MOSFET has a gate, a source, and a drain; the drain is connected to the DC conversion unit; the source is connected to a first terminal of the first resistor and the low-voltage device; the gate is connected to a second terminal of the first resistor and a first terminal of the second resistor; a second terminal of the second resistor is connected to the control unit.

14. The method of operating the output power protection apparatus in claim 12, wherein the transistors are p-type MOSFETs; each p-type MOSFET has a gate, a source, and a drain; the drain is connected to the low-voltage device; the source is connected to a first terminal of the first resistor and the DC conversion unit; the gate is connected to a second terminal of the first resistor and a first terminal of the second resistor; a second terminal of the second resistor is connected to the control unit.

15. The method of operating the output power protection apparatus in claim 12, wherein the number of the transistor is determined according to the output power of the DC conversion unit and consumed heat of the transistors.

16. The method of operating the output power protection apparatus in claim 11, further comprising:

(f) providing a filtering unit, the filtering unit connected to the DC conversion unit, and configured to receive the input DC power and filter the input DC power.

17. The method of operating the output power protection apparatus in claim 11, wherein the DC conversion unit is a non-isolated DC-to-DC converter or an isolated DC-to-DC converter.

18. The method of operating the output power protection apparatus in claim 17, wherein the output protection apparatus is configured to provide a short-circuit protection between the high-voltage battery and the low-voltage battery and a polarity reverse protection of the low-voltage battery when the DC conversion unit is the non-isolated DC-to-DC converter.

19. The method of operating the output power protection apparatus in claim 17, wherein the output protection apparatus is configured to provide a polarity reverse protection of the low-voltage battery when the DC conversion unit is the isolated DC-to-DC converter.

20. The method of operating the output power protection apparatus in claim 11, wherein the input DC power is generated from a rechargeable battery or a generator.

\* \* \* \* \*